(12) United States Patent
Chang et al.

(10) Patent No.: US 9,068,315 B2
(45) Date of Patent: Jun. 30, 2015

(54) OIL FENCE AND METHOD FOR STORING SAME

(75) Inventors: Dae Jun Chang, Jung-gu Ulsan (KR); Pal G Bergan, YuSeong-Gu DaeJeon (KR); Hyun Chung, YuSeong-Gu DaeJeon (KR); Jeong Min Kwak, YuSeong-Gu DaeJeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 0 days.

(21) Appl. No.: 13/992,374

(22) PCT Filed: Nov. 16, 2011

(86) PCT No.: PCT/KR2011/008737
§ 371 (c)(1),
(2), (4) Date: Sep. 11, 2013

(87) PCT Pub. No.: WO2012/077919
PCT Pub. Date: Jun. 14, 2012

(65) Prior Publication Data
US 2013/0343820 A1     Dec. 26, 2013

(30) Foreign Application Priority Data
Dec. 8, 2010   (KR) .......................... 10-2010-0124799

(51) Int. Cl.
*E02B 15/06* (2006.01)
*E02B 15/08* (2006.01)

(52) U.S. Cl.
CPC ............. *E02B 15/06* (2013.01); *E02B 15/0807* (2013.01); *E02B 15/0814* (2013.01); *E02B 15/0842* (2013.01); *E02B 15/085* (2013.01); *E02B 15/0878* (2013.01)

(58) Field of Classification Search
CPC . E02B 15/06; E02B 15/0814; E02B 15/0864; E02B 15/0878
USPC ............................... 405/63, 64, 66, 67, 68, 69
See application file for complete search history.

(56) References Cited

U.S. PATENT DOCUMENTS

| | | | | |
|---|---|---|---|---|
| 3,779,020 A | * | 12/1973 | Muramatsu et al. | 405/64 |
| 3,921,407 A | * | 11/1975 | Neal | 405/63 |
| 4,116,833 A | * | 9/1978 | Stagemeyer et al. | 210/776 |
| 4,133,765 A | * | 1/1979 | Stupica | 405/63 |

(Continued)

FOREIGN PATENT DOCUMENTS

| | | |
|---|---|---|
| JP | 09250127 | 9/1997 |
| KR | 100301417 | 6/2001 |

(Continued)

*Primary Examiner* — Frederick L Lagman
(74) *Attorney, Agent, or Firm* — Cantor Colburn LLP

(57) ABSTRACT

The present invention relates to an oil fence and to a method for storing same. The oil fence includes: a vertical support part on which an air chamber, a water chamber, and a ballast are successively disposed in the lengthwise direction thereof; a curtain part connected between the vertical support parts disposed parallel to and spaced a predetermined distance from each other in the widthwise direction thereof; and attenuation bags disposed on the upper and lower portions of the curtain part. Thus, the oil fence may prevent seawater containing oil from overflowing in spite of high waves. Also, the oil fence may stably float on the sea in spite of poor weather conditions and high waves and may be easily stored and unfolded.

11 Claims, 8 Drawing Sheets

(56) References Cited

U.S. PATENT DOCUMENTS

| | | | | |
|---|---|---|---|---|
| 4,248,547 | A | * | 2/1981 | Brown .............................. 405/72 |
| 4,484,836 | A | * | 11/1984 | Bailard ........................... 405/64 |
| 5,102,262 | A | * | 4/1992 | Brown .............................. 405/70 |
| 5,238,327 | A | * | 8/1993 | Blair et al. ...................... 405/68 |
| 5,267,813 | A | * | 12/1993 | Neal ................................ 405/72 |
| 5,269,627 | A | * | 12/1993 | Neal ................................ 405/70 |
| 6,576,141 | B2 | * | 6/2003 | Turner et al. .................... 405/63 |
| 7,140,599 | B1 | * | 11/2006 | Spink .............................. 405/71 |
| 8,303,212 | B2 | * | 11/2012 | Lara ................................ 405/70 |
| 2014/0099166 | A1 | * | 4/2014 | Neal et al. ....................... 405/63 |

FOREIGN PATENT DOCUMENTS

| | | |
|---|---|---|
| KR | 200386298 | 5/2005 |
| KR | 200423736 | 8/2006 |

* cited by examiner

OIL FENCE AND METHOD FOR STORING SAME

TECHNICAL FIELD

The present invention relates to an oil fence and a storage method thereof, and more particularly, to an oil fence including vertical support parts sequentially provided with an air chamber, a water chamber, and a ballast in a length direction, a curtain part connected between the vertical support parts disposed in parallel with each other, being spaced apart from each other a predetermined distance in a width direction and damper pockets disposed over or under the curtain, thereby preventing seawater including oil from going over the oil fence even in a high wave, having the oil fence stably float on the sea even in a severe weather condition and a high wave, and making storage and deployment easy, and a storage method thereof.

BACKGROUND ART

When oil is spilt to the sea due to a collision of ships loaded with oil, such as an oil tanker, and the like, on the sea, an oil fence may be used to prevent the spilt oil from diffusing and rapidly collect the spilt oil.

When the oil spill accident occurs on the sea, the oil fence is loaded in a moving ship performing a function of a barrier to move to an area to which oil is spilt and then is disposed around an area to which oil is spilt by a tugboat, and the like, to prevent the spilt oil from diffusing. Thereafter, a collection ship collects the oil blocked by the oil fence.

In general, the oil fence is configured to include a buoyancy sieve, a curtain part coupled with a lower portion of the buoyancy sieve, and a connection part connecting the buoyancy with the curtain part to extend a length of the curtain part. As an example of the configuration, as illustrated in FIG. 1, an oil fence 10 forms an air pocket 12 which is inserted into a buoyancy part 11 to make the buoyancy part 11 float on the surface of the water, an air valve 14 which injects and discharges air into and from the air pocket 12, and an air receiving part 13 which receives air injected into the air valve 14.

Further, the curtain part 20 connected under the buoyancy part 11 blocks oil passing under the sea and is provided with a ballast part 30 which has a weight body, i.e., a chain 31 inserted thereinto to have the curtain part 20 keep a horizontal state and stably float on the surface of the water.

The oil fence is configured to include zippers 41 which are disposed at rear and front at both ends of the buoyancy part 11, a fixed band 42 for preventing an excessive force from being applied to the zipper 41, and a connection part 40 including a fastening ring 43 fastening the fixed band 42 of the additionally connected oil fence 10.

Therefore, when a polluted sea area is wide, the plurality of oil fences 10 is connected with each other to clean up the spilt oil.

However, when a shoreline structure is uneven due to the hitting of wave, the exposed rocks, and the like, the oil fence is hard to stably stand and to keep an original function due to oil going over the oil fence.

DISCLOSURE

Technical Problem

An exemplary embodiment of the present invention is directed to providing an oil fence including vertical support parts sequentially provided with an air chamber, a water chamber, and a ballast in a length direction and a curtain part connected between the vertical support parts disposed in parallel with each other, being spaced apart from each other at a predetermined distance in a width direction, thereby having the oil fence stably float on the sea even in the case in which a height of the curtain part is high or a weather condition is severe.

Another exemplary embodiment of the present invention is directed to providing an oil fence having damper pockets disposed over and under of a curtain part, thereby preventing a seawater including oil from going over the oil fence even in a high wave.

Technical Solution

In one general aspect, there is provided an oil fence preventing oil spilt on the sea from diffusing, including: tube-shaped vertical support parts 100 including an air chamber 110 having air injected thereinto to have buoyancy, a water chamber 120 disposed under the air chamber 110 and absorbed with water, and a ballast 130 disposed under the water chamber 120 and providing a load; and a membrane type of curtain part 200 connected between the vertical support parts 100 disposed in parallel with each other, being spaced apart from each other at a predetermined distance in a width direction of the oil fence 1 and blocking and collecting oil.

A predetermined area of an upper portion of the air chamber may be disposed over a sea surface and a predetermined area of a lower portion of the air chamber 100, the water chamber 120, and the ballast 130 may be disposed under a sea surface.

An upper portion of the water chamber 120 may be provided with at least one air outlet 121 and a lower portion of the water chamber 120 may be provided with a water inlet 122.

At least one of edges of upper and lower portions of the curtain part 200 may be provided with a damper pocket 210 of which one portion is opened.

Upper, middle, and lower portions of the vertical support part 100 may be provided with clamps or rings 140 in a length direction of the vertical support part 100 to be coupled with the curtain part 200 by a wire 150 longitudinally connected to the curtain part 200.

The curtain part 200 is configured to form vertical support part inserting pockets 220 corresponding to the vertical support parts 100 at both ends of the vertical support part 100 in a height direction of the curtain part 200 so that both ends of the vertical support part 100 are inserted into the vertical support part inserting pocket 220 in a height direction of the vertical support part 100.

The ballast 130 may be made of a material having a specific gravity twice as high as seawater.

The vertical support part 100 may be made of a polymer having high corrosion resistance or steel material.

The oil fence 1 may be stored in at least one storage box 3 adjacently disposed to each other by being folded and have both ends located outside the storage box 3 in a length direction of the curtain part.

The oil fence may be stored by being wound around a winding means 2.

Advantageous Effects

According to the exemplary embodiments of the present invention, the oil fence includes the vertical support parts sequentially provided with the air chamber, the water chamber, and the ballast in a length direction and the curtain part connected between the vertical support parts and provided in parallel with each other, being spaced apart from each other at a predetermined distance in a width direction, thereby having the oil fence stably float on the sea even in the case in which the height of the curtain part is high or a weather condition is severe.

Further, according to the exemplary embodiments of the present invention, the oil fence includes the damper pockets disposed over and under the curtain part, thereby damping the movement of the oil fence in a vertical direction and preventing the seawater including oil from going over the oil fence even in the high wave.

In addition, according to the oil fence according to the exemplary embodiments of the present invention, the curtain part and the vertical support part can be conveniently detached and attached to partially replace and clean the polluted parts, thereby facilitating the recycling of the curtain part and the vertical support part.

Also, according to the oil fence according to the exemplary embodiments of the present invention, the vertical support part is manufactured by the extruding process, thereby easily controlling the height of the vertical support part depending on the height of the curtain part, simplifying the manufacturing process, increasing the manufacturing efficiency, and saving the manufacturing costs.

Moreover, according to the exemplary embodiments of the present invention, the oil fence can effectively prevent oil from diffusing at the time of the oil spill to the sea and facilitate the recovery, thereby preventing the environmental damages from additionally occurring.

BEST MODE

Hereinafter, an oil fence and a storage method thereof according to the present disclosure having the above-mentioned features will be described in more detail with reference to the accompanying drawings.

Figure 1:
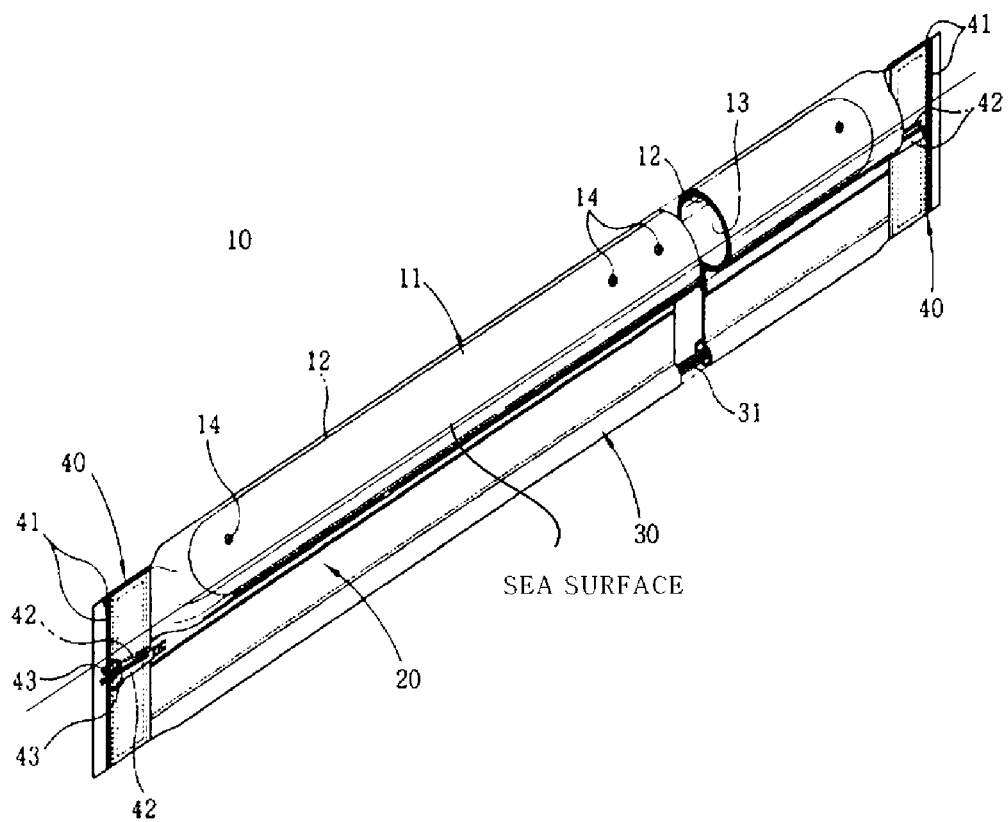
FIG. 1 is a perspective view illustrating an oil fence according to the related art.
Figure 2:
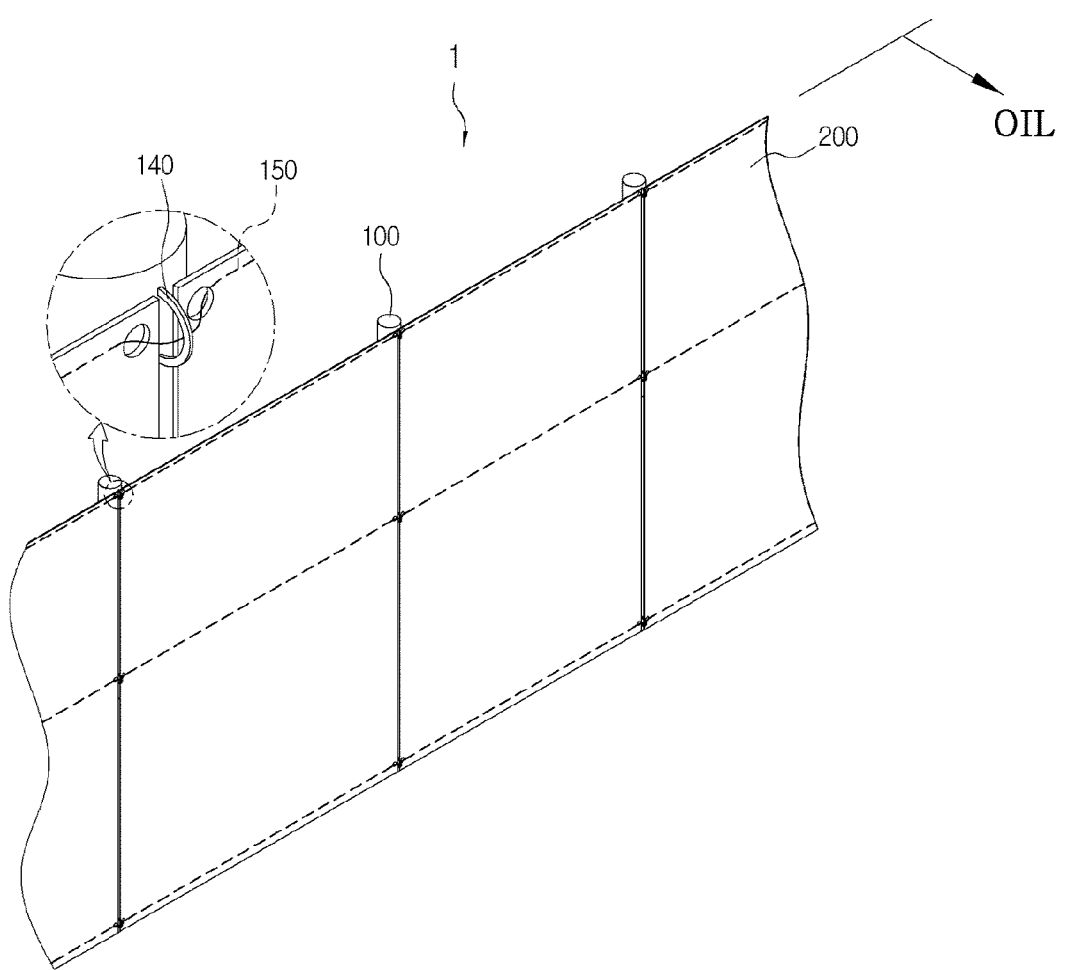
FIG. 2 is a perspective view illustrating an oil fence according to an exemplary embodiment of the present invention.
Figure 3:
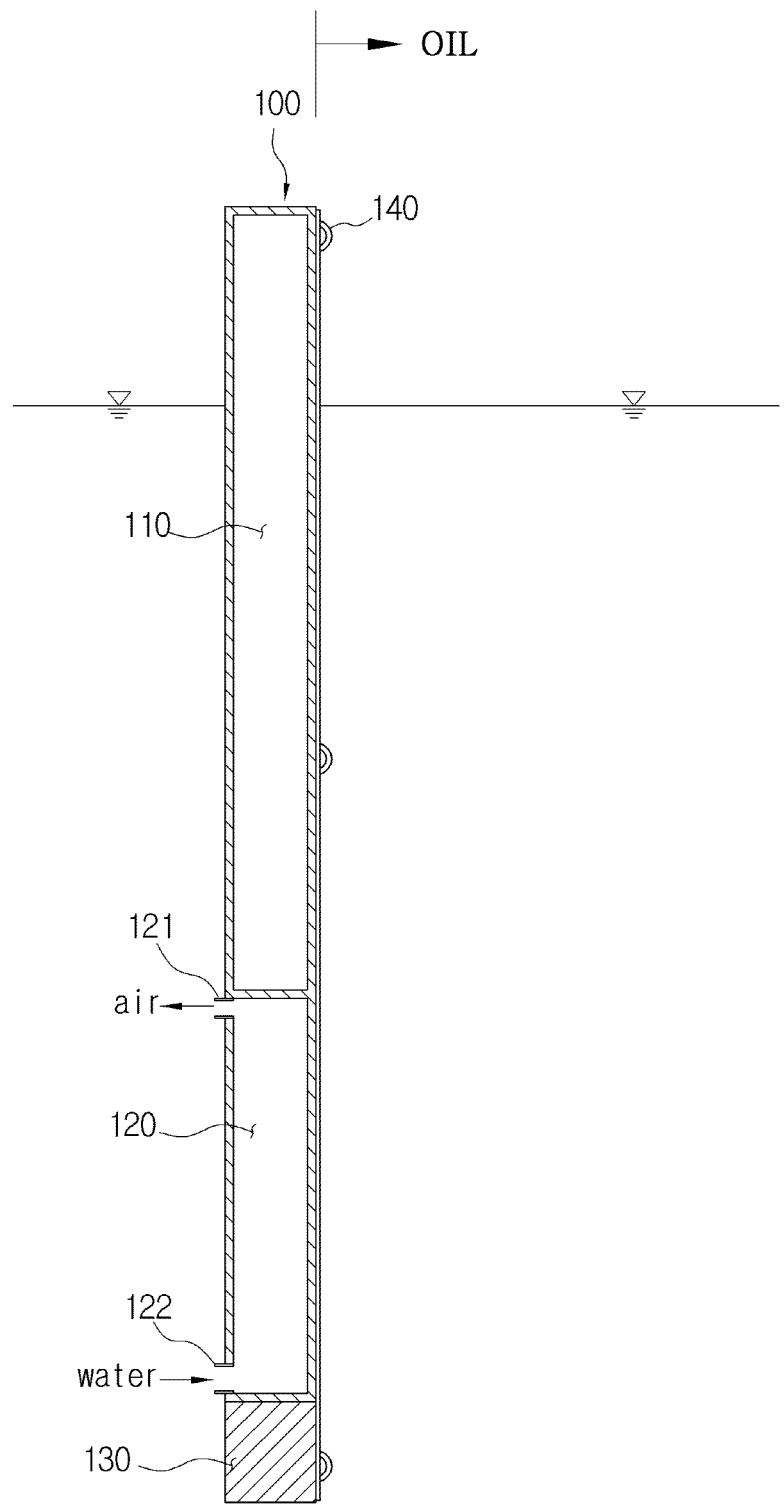
FIG. 3 is a cross-sectional view illustrating a vertical support part of the oil fence according to the exemplary embodiment of the present invention.
Figure 4:
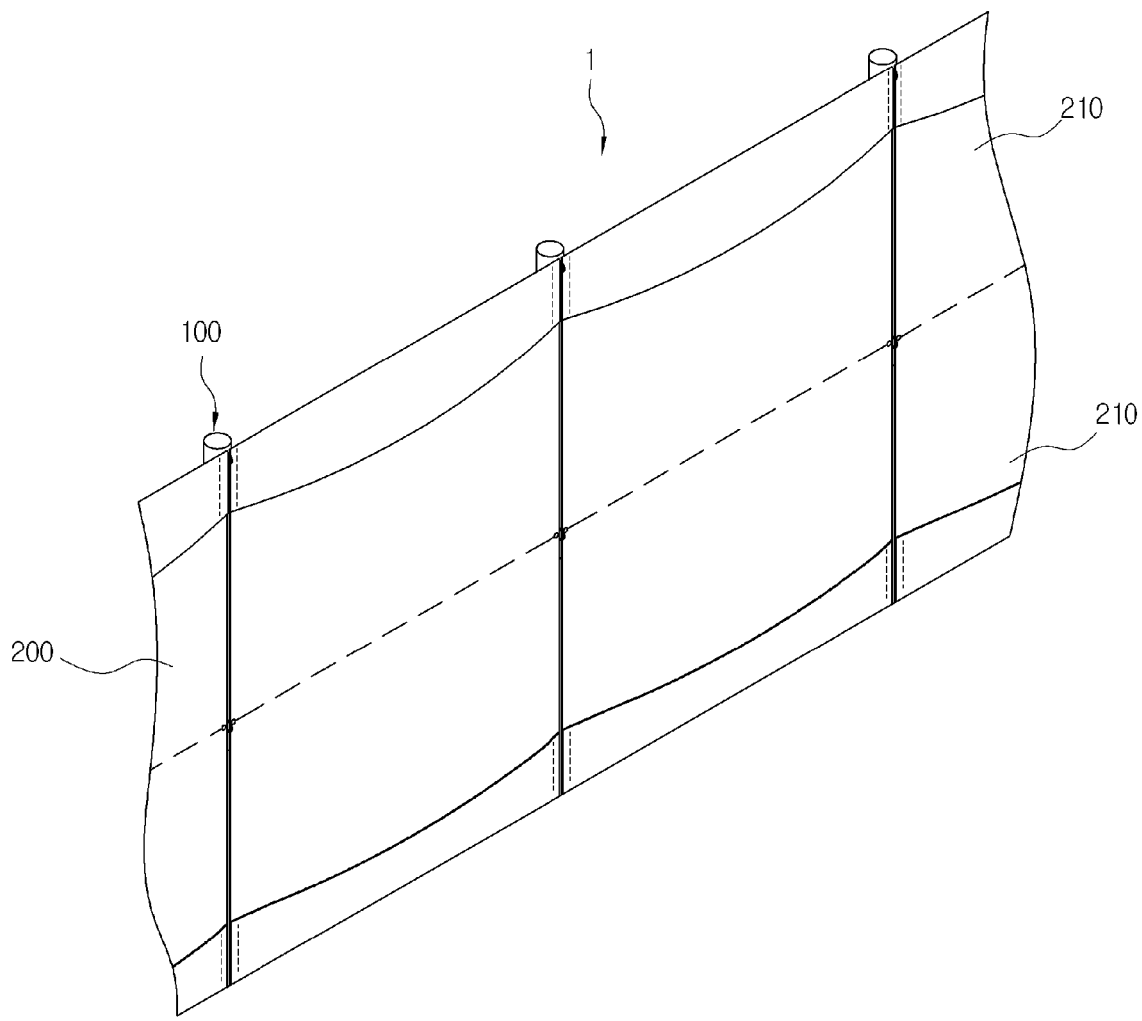
FIG. 4 is a perspective view illustrating an oil fence according to another exemplary embodiment of the present invention.
Figure 5:
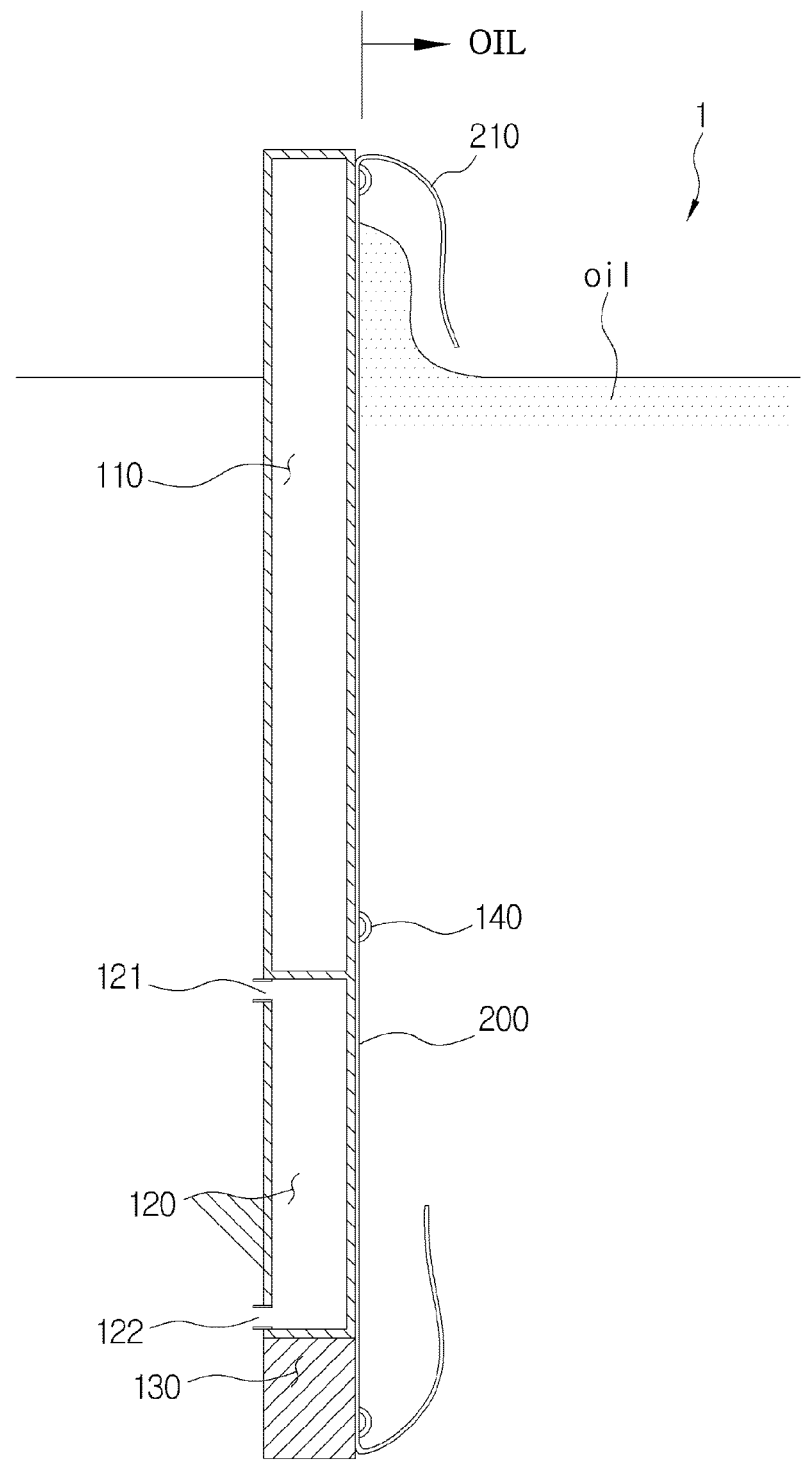
FIG. 5 is a cross-sectional view illustrating an oil fence according to another exemplary embodiment of the present invention.
Figure 6:
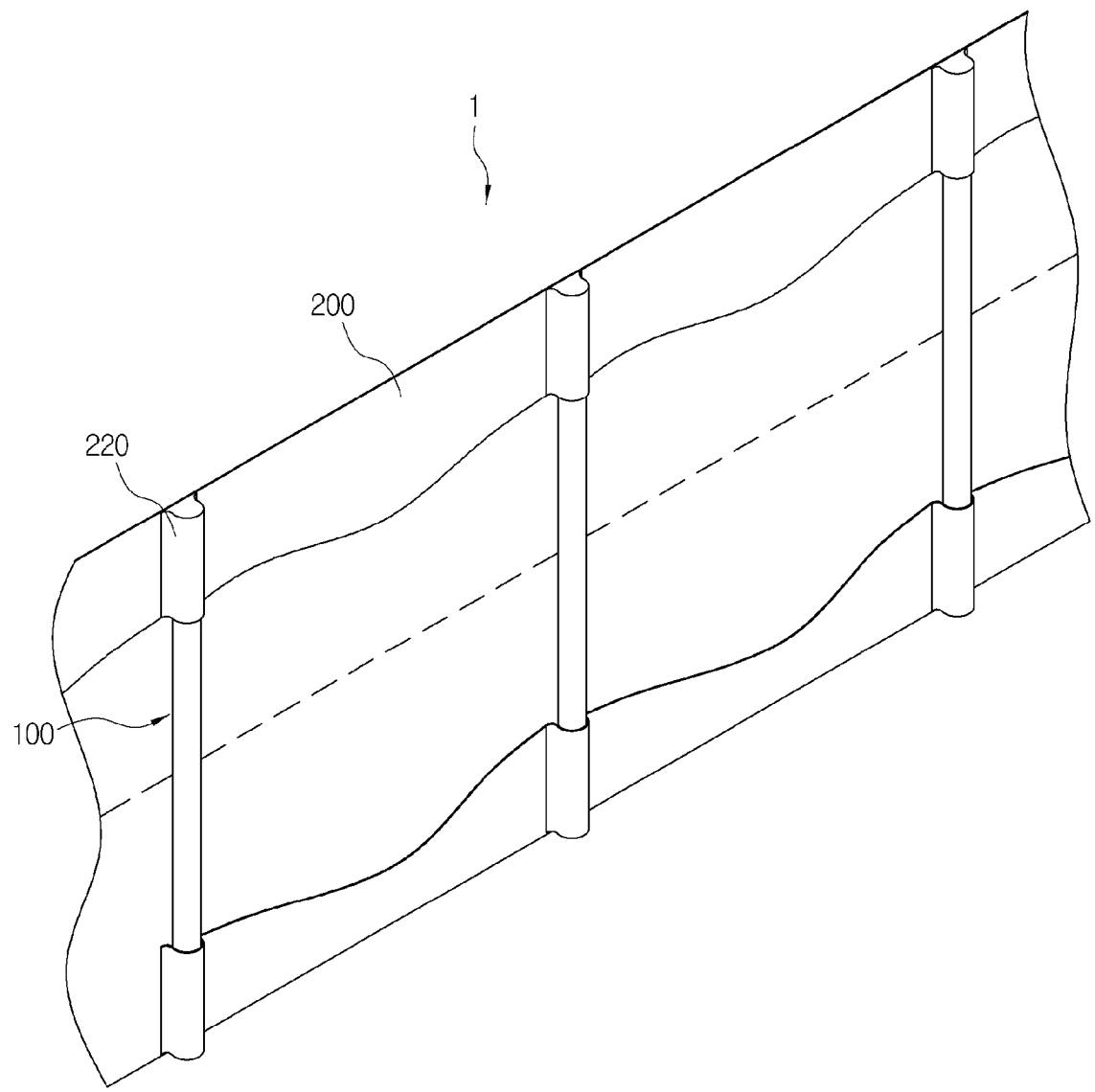
FIG. 6 is an exploded perspective view illustrating an oil fence according to another exemplary embodiment of the present invention.
Figure 7:
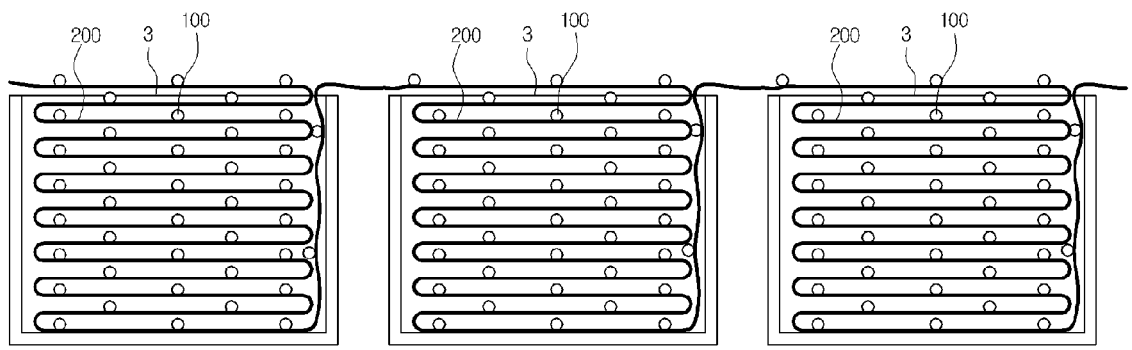
FIG. 7 is a diagram schematically illustrating a storage method of an oil fence according to an exemplary embodiment of the present invention.
Figure 8:
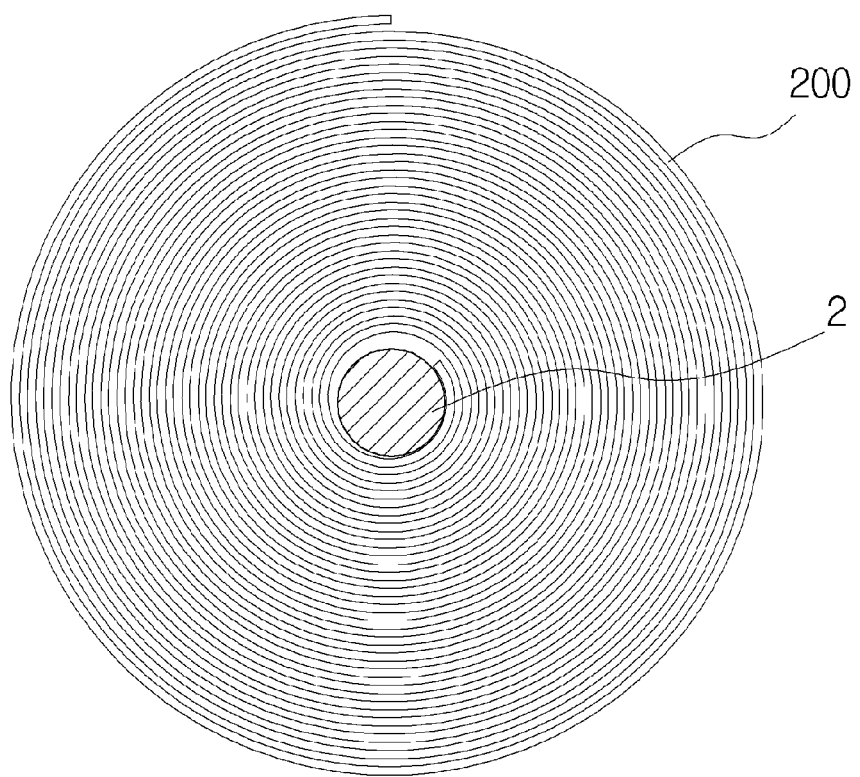
FIG. 8 is a diagram schematically illustrating a storage method of an oil fence according to another exemplary embodiment of the present invention.
Figure 9:
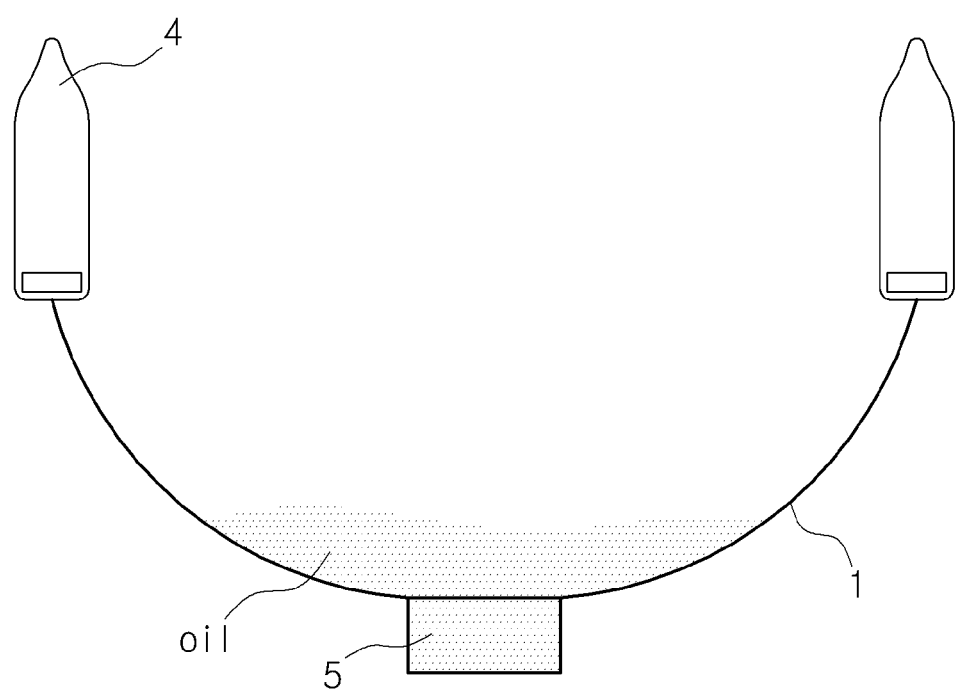
FIG. 9 is a diagram schematically showing a state in which the oil fence according to the exemplary embodiment of the present invention is deployed.

FIG. 1 is a perspective view illustrating an oil fence according to the related art, FIG. 2 is a perspective view illustrating an oil fence according to an exemplary embodiment of the present invention, FIG. 3 is a cross-sectional view illustrating a vertical support part of the oil fence according to the exemplary embodiment of the present invention, FIG. 4 is a perspective view illustrating an oil fence according to another exemplary embodiment of the present invention, FIG. 5 is a cross-sectional view illustrating an oil fence according to another exemplary embodiment of the present invention, FIG. 6 is an exploded perspective view illustrating an oil fence according to another exemplary embodiment of the present invention, FIG. 7 is a diagram schematically illustrating a storage method of an oil fence according to an exemplary embodiment of the present invention, FIG. 8 is a diagram schematically illustrating a storage method of an oil fence according to another exemplary embodiment of the present invention, and FIG. 9 is a diagram schematically showing a state in which the oil fence according to the exemplary embodiment of the present invention is deployed.

An oil fence 1 according to an exemplary embodiment of the present invention is to prevent oil spilt to the sea from diffusing and is largely configured to include a vertical support part 100 and a curtain part 200.

The vertical support part 100 is configured to include an air chamber 110, a water chamber 120, and a ballast 130. As illustrated in FIG. 3, the air chamber 110 is disposed at a top of the vertical support part 100 and is injected with air to have buoyancy. The water chamber 120 is disposed under the air chamber 110 and has water absorbed thereinto and the ballast 130 is disposed under the water chamber 120 to provide a load.

As illustrated in FIGS. 2 and 3, the vertical support part 100 is a tube-shaped structure made of a light material. The vertical support part 100 has a hollowed inner portion, like a cylinder or a squared bar of which the edge is round and may be variously manufactured in consideration of strength or buoyancy floating on the water.

Since the vertical support part 100 is sunk in the seawater, the vertical support part 100 has to be made of a material which is not corroded well. Therefore, the vertical support part 100 may be made of a fiber reinforced polymer composite material having high corrosion resistance, a polymer or steel material, such as aluminum or stainless steel, and the like.

Further, the vertical support part 100 may be manufactured by an extruding process to easily control a length thereof depending on a height of a curtain.

The ballast 130 configuring the vertical support part 100 is disposed at a bottom of the vertical support part 100 so that the vertical support structure may stably stand up in the sea.

The ballast 130 may be fastened with a lower portion of the vertical support part 100 by a bolt, but may be fastened therewith by other methods.

As the volume of the material forming the ballast increases, the vertical support part 100 may be more stably disposed. However, in terms of costs, the ballast 130 may have a specific gravity twice as high as seawater and may be made of steel, concrete, or lead.

The air chamber 110 fills air into an upper area of the vertical support part 100 to have the vertical support part 100 float on the water and a size of the air chamber 110 is determined depending on the weight and density of the ballast 130 and a design specification of the vertical support part 100.

The air chamber 110 is separated within the area of the vertical support part 100 and upper and lower portions thereof may be sealed with a cover or a membrane to be filled with air.

The water chamber 120 is an important element in terms of the buoyancy and stability of the vertical support part 100 and is an area which is disposed between the air chamber 110 and the ballast 130 and is filled with water.

An upper portion of the water chamber 120 is provided with an air outlet 121 and a lower portion thereof is provided with a water inlet 122. By the configuration, when the oil fence 1 is deployed on the sea, water is absorbed through the water inlet 122 while the air filled in the water chamber 120 is discharged through the air outlet 121, such that water is slowly filled in the water chamber 120.

In this case, the water inlet 122 and the air outlet 121 may be formed in at least one may be formed in plural.

When the oil fence 1 according to the exemplary embodiment of the present invention is deployed on the sea, the predetermined area of a lower portion of the oil fence 1 is sunk under a sea surface by a load of the ballast 130. As a result, water is introduced into the water chamber 120 which is disposed on an upper portion of the ballast 130, such that the vertical support part stands up in the sea by a load of the water chamber 120.

Therefore, since water is not filled in the water chamber 120 until the oil fence 1 is deployed on the sea, the oil fence 1 is lighter than the oil fence according to the related art, such that the oil fence 1 may be easily stored and transported.

As described above, the water chamber 120 and the ballast 130 act as the load of the vertical support part to have the oil fence 1 sunk in the sea when the oil fence 1 is deployed on the sea. On the other hand, the air chamber 110 has the oil fence 1 float on the sea while preventing the oil fence 1 from being fully sunk in the sea and the predetermined area of the upper portion is disposed over a sea surface and a predetermined area of a lower portion thereof is disposed under a sea surface.

In this case, the air chamber 110 disposed over a sea surface may be about ⅓ of the air chamber.

In general, the vertical support part 100 has a length of about 1 to 10 m and is disposed in parallel with the adjacent vertical support part 100, being spaced apart from each other by about 0.5 to 10 m.

The curtain part 200 has a bar shape and is connected between the vertical support parts 100 disposed in parallel with each other, being spaced apart from each other at a predetermined distance in a width direction of the oil fence 1 and may substantially block oil and allow oil to be collected into the oil fence 1.

The curtain part 200 may be made of a cloth material which has a specific gravity similar to that of the seawater to prevent oil from permeating and endures a tension applied in a length direction of the curtain part 200.

As illustrated in FIGS. 4 and 5, the oil fence 1 is provided with a damper pocket 210 of which one portion is opened at edges of the upper and lower portions of the curtain part 200, thereby increasing a fluid drag of the oil fence 1 to reduce a vertical movement thereof and preventing seawater mixed with oil from splashing over the oil fence 1 or being spilt down the oil fence.

Meanwhile, as illustrated in FIG. 2, the upper, middle, and lower portions of the vertical support part 100 may be provided with clamps or rings 140 in a length direction of the vertical support part 100 to be coupled with the curtain part 200 by a wire 150 longitudinally connected to the curtain part 200.

As another exemplary embodiment of the present invention, as illustrated in FIG. 6, a vertical support part inserting pockets 220 corresponding to the vertical support parts 100 may be formed at both ends of the vertical support part 100 in a height direction of the curtain part 200 so that both ends of the vertical support part 100 are inserted into the vertical support part inserting pocket 220 in a height direction of the vertical support part 100. In this configuration, both ends of the vertical support part 100 are sequentially inserted into the vertical support part inserting pocket 220.

Therefore, in the oil fence the vertical support part 100 is conveniently detached and attached from and to the curtain part 200 to partially replace and clean the polluted part, thereby facilitating the recycling of the curtain part and the vertical support part.

In this case, the method of coupling the curtain part 200 and a vertical support part 100 is not limited to the above-mentioned coupling method, and therefore can be more efficiently changed without being limited.

Meanwhile, as illustrated in FIG. 7 or 8, the oil fence 1 is stored in one or more storage boxes 3 adjacent to each other or may be stored by being wound around a winding means 2.

In particular, when the oil fence 1 is stored in one or more storage boxes 3 adjacent to each other by being folded, both ends of the oil fence 1 may be disposed outside the storage box 3 in the length direction of the curtain part 200.

Therefore, since the oil spill area on the sea surface is wide, when it is necessary to expand the length of the curtain part 200, the length of the curtain part 200 may be conveniently expanded by connecting both ends of the curtain part 200 stored in the adjacent storage boxes 3 as illustrated in FIG. 7.

As described above, the oil fence 1 may depend on types, such as an assembling and storage type, an assembling type on a ship, and the like. The assembling and storage type stores the oil fence 1 by winding the oil fence 1 around the winding means 2 such as a roll or stores the oil fence 1 in the storage box 3 by being folded sequentially under the condition in which the vertical support part 100 and the curtain part 200 configuring the oil fence 1 are assembled and when oil is spilt, moves the oil fence to the oil spill area by a ship or a helicopter to be immediately disposed and deployed on the sea.

On the other hand, the assembling type on a ship stores the oil fence under the condition in which the vertical support part 100 and the curtain part 200 configuring the oil fence 1 are separated from each other and when oil is spilt, couples the vertical support part 100 and the curtain part 200 and then disposes and deploys the oil fence on the sea.

When the oil fence 1 is disposed and deployed on the sea, the oil fence 1 may be deployed so that seawater polluted with oil is located at a portion at which the damper pocket 210 is disposed, but when the oil fence 1 does not include the damper pocket 210, the oil fence may be deployed so that seawater polluted with oil is located at an opposite surface to a portion at which the vertical support part 100 is disposed.

Meanwhile, when the oil fence 1 is connected to a helicopter or a ship 4 to be deployed, both ends of the oil fence 1 may be connected to each other by a tensile wire in a width direction and may be connected to an additional machine to be rapidly deployed.

Further, the oil fence 1 may be connected to an oil collection apparatus 5, such as an oil skimmer, to collect oil remaining in the oil fence.

Therefore, the oil fence includes the vertical support parts sequentially provided with the air chamber, the water chamber, and the ballast in a length direction and the curtain part connected between the vertical support parts and provided in parallel with each other, being spaced apart from each other at a predetermined distance in a width direction, thereby having the oil fence stably float on the sea even in the case in which the height of the curtain part is high or a weather condition is severe.

Further, the method of storing and deploying an oil fence according to the exemplary embodiments of the present invention can facilitate the storage and transportation of the oil fence and can deploy the oil fence even in the severe weather condition and the high wave.

Further, according to the exemplary embodiments of the present invention, the oil fence includes the damper pockets disposed over and under the curtain part, thereby damping the movement of the oil fence in a vertical direction and preventing the seawater including oil from going over the oil fence even in the high wave.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. An oil fence preventing oil spilt on the sea from diffusing, comprising:

tube-shaped vertical support parts including an air chamber having air injected thereinto to have buoyancy, a water chamber disposed under the air chamber and absorbed with water, and a ballast disposed under the water chamber and providing a load; and a membrane type of curtain part connected between the vertical support parts disposed in parallel with each other, being spaced apart from each other at a predetermined distance in a width direction of the oil fence and blocking and collecting oil, a damper pocket disposed at least one of edges of upper and lower portions of the curtain part, one end portion of the damper pocket being connected to the edge of the upper portion or the lower portion of the curtain and the other end portion of the damper pocket being opened towards the lower portion or the upper portion of the curtain to thereby reduce an upper or lower movement of the curtain part.

2. The oil fence of claim 1, wherein a predetermined area of an upper portion of the air chamber is disposed over a sea surface, and a predetermined area of a lower portion of the air chamber, the water chamber, and the ballast are disposed under a sea surface.

3. The oil fence of claim 2, wherein an upper portion of the water chamber is provided with at least one air outlet, and a lower portion of the water chamber is provided with at least a water inlet.

4. The oil fence of claim 1, wherein upper, middle, and lower portions of the vertical support part are provided with clamps or rings in a length direction of the vertical support part to be coupled with the curtain part by a wire longitudinally connected to the curtain part.

5. The oil fence of claim 4, wherein the ballast is made of a material having a specific gravity twice as high as seawater.

6. The oil fence of claim 5, wherein the vertical support part is made of a polymer having high corrosion resistance or steel material.

7. The oil fence of claim 1, wherein the curtain part is configured to form vertical support part inserting pockets corresponding to the vertical support parts at both ends of the vertical support part in a height direction of the curtain part so that both ends of the vertical support part are inserted into the vertical support part inserting pocket in a height direction of the vertical support part.

8. The oil fence of claim 7, wherein the ballast is made of a material having a specific gravity twice as high as seawater.

9. The oil fence of claim 8, wherein the vertical support part is made of a polymer having high corrosion resistance or steel material.

10. A storage method of the oil fence of claim 1, wherein the oil fence is stored in at least one storage box adjacently disposed to each other by being folded and has both ends located outside the storage box in a length direction of the curtain part.

11. A storage method of the oil fence of claim 1, wherein the oil fence is stored by being wound around a winding means.

* * * * *